United States Patent
Vergelati et al.

(10) Patent No.: US 9,624,373 B2
(45) Date of Patent: Apr. 18, 2017

(54) THERMOPLASTIC COMPOSITION BASED ON POLYAMIDE, POLYKETONE AND NOVOLAC RESIN

(75) Inventors: Caroll Vergelati, Saint Baudille de la Tour (FR); Franck Touraud, Eyzin Pinet (FR); Olivier Andres, Mions (FR)

(73) Assignee: RHODIA OPERATIONS, Paris (FR)

( * ) Notice: Subject to any disclaimer, the term of this patent is extended or adjusted under 35 U.S.C. 154(b) by 531 days.

(21) Appl. No.: 13/641,345

(22) PCT Filed: Apr. 13, 2011

(86) PCT No.: PCT/EP2011/055771
§ 371 (c)(1),
(2), (4) Date: Dec. 27, 2012

(87) PCT Pub. No.: WO2011/128358
PCT Pub. Date: Oct. 20, 2011

(65) Prior Publication Data
US 2013/0144001 A1    Jun. 6, 2013

(30) Foreign Application Priority Data
Apr. 13, 2010  (FR) ...................... 10 01543

(51) Int. Cl.
| | | |
|---|---|---|
| *C08L 77/00* | (2006.01) | |
| *C08L 73/00* | (2006.01) | |
| *C08L 61/06* | (2006.01) | |

(52) U.S. Cl.
CPC .............. *C08L 77/00* (2013.01); *C08L 73/00* (2013.01); *C08L 61/06* (2013.01); *C08L 2205/03* (2013.01)

(58) Field of Classification Search
CPC ...................................... C08L 77/00
USPC ....................................... 524/538
See application file for complete search history.

(56) References Cited

U.S. PATENT DOCUMENTS

| | | |
|---|---|---|
| 3,694,412 A | 9/1972 | Nozaki |
| 4,843,144 A | 6/1989 | Van Broekhoven et al. |
| 4,880,903 A | 11/1989 | Van Broekhoven et al. |
| 5,274,040 A | 12/1993 | Machado |
| 5,698,663 A * | 12/1997 | Kinneberg .................... 528/392 |
| 5,959,069 A | 9/1999 | Gluck et al. |
| 6,525,166 B1 | 2/2003 | Di Silvestro et al. |
| 6,867,256 B1 | 3/2005 | Di Silvestro et al. |
| 6,872,800 B1 | 3/2005 | Bouquerel et al. |
| 2001/0051227 A1* | 12/2001 | Jung et al. ..................... 427/486 |
| 2003/0199607 A1 | 10/2003 | Cheng et al. |
| 2010/0137479 A1 | 6/2010 | Couillens et al. |

FOREIGN PATENT DOCUMENTS

| | | |
|---|---|---|
| EP | 0 682 057 A1 | 11/1995 |
| EP | 0 632 703 B1 | 2/1999 |
| EP | 0 832 149 B1 | 7/2000 |
| FR | 2 743 077 A1 | 7/1997 |
| FR | 2 779 730 A1 | 12/1999 |
| GB | 2 291 062 A | 1/1996 |
| WO | 99/03909 A1 | 1/1999 |
| WO | 00/68298 A1 | 11/2000 |
| WO | 2008/055872 A1 | 5/2008 |

OTHER PUBLICATIONS

International Search issued on Jul. 21, 2011, by the European Patent Office as the International Searching Authority in International Patent Application No. PCT/EP2011/055771.

* cited by examiner

*Primary Examiner* — Michael Pepitone

(57) ABSTRACT

A thermoplastic composition based on polyamide and polyketone is described. The thermoplastic composition can have an excellent mechanical strength and dimensional stability. Further, the composition can include a novolac resin and a reinforcing or a bulking filler. The composition can be molded, for example in the form of granules or powder, which is used for manufacturing articles via an injection-molding process.

12 Claims, No Drawings

THERMOPLASTIC COMPOSITION BASED ON POLYAMIDE, POLYKETONE AND NOVOLAC RESIN

CROSS-REFERENCE TO PRIOR APPLICATIONS

This application is a National Stage of PCT/EP2011/055771, filed Apr. 13, 2011, and designating the United States (published in French on Oct. 20, 2011, as WO 2011/128358 A1; the title and abstract were published in English), which claims priority to FR 10/01543, filed Apr. 13, 2010, each hereby expressly incorporated by reference in its entirety and each assigned to the assignee hereof.

The present invention relates to a thermoplastic composition based on polyamide and polyketone exhibiting an excellent compromise in mechanical strengths and dimensional stability. The composition comprises in particular novolac resin and optionally reinforcing or bulking fillers. The composition is preferably a composition to be molded, for example in the form of granules or powder, used for the manufacture of articles by an injection molding process.

Industrial polyamides are used for the preparation of numerous articles in various fields, such as the motor vehicle field, where specific properties of stiffness, impact strength, dimensional stability, in particular at relatively high temperature, surface appearance, density and weight are particularly desired. The choice of a material for a given application is generally guided by the level of performance required with regard to certain properties and by its cost. In fact, a search is always underway for novel materials capable of meeting requirements in terms of performance and/or costs.

Furthermore, it is known to use novolac resins in polyamide compositions in order to reduce their water uptake and to increase the dimensional stability of the formed articles. However, novolac resin brings about a decline in the mechanical properties of the polyamide matrix, in particular its strength. There thus existed a need to develop polyamide compositions exhibiting a very good compromise between the water uptake and the mechanical properties.

The Applicant Company has just discovered, entirely surprisingly, that the use of a polyketone in a polyamide composition comprising a novolac resin makes it possible to obtain novel compromises in properties with regard to the control of the dimensional stability, the signature of which, with respect to the material, is a better inhibition of the water absorption and much better mechanical properties.

The present invention thus relates to a composition obtained by melt blending at least the following compounds: a polyamide, a polyketone and a novolac resin.

This is because it is observed, contrary to what might have been expected in the industrial field of polyamide formulations, that the well-known negative effect of novolac on some of the mechanical properties was not observed by the combination of the action of novolac resin and polyketone on the polyamide matrix. This synergistic action made it possible, in addition, to enhance said properties with respect to what was known previously.

The invention also relates to the combined use of a novolac resin and a polyketone as agent for reinforcing the mechanical properties of the polyamide, in particular for increasing the breaking stress of a polyamide composition. Furthermore, the invention relates to the combined use of a novolac resin and a polyketone in the manufacture of a modified polyamide exhibiting enhanced mechanical properties. The invention also relates to a composition, comprising at least novolac resin and a polyketone, intended to be blended with polyamide.

The polyamide of the invention can be a semi-crystalline or amorphous polyamide or copolyamide, such as aliphatic polyamides, semi-aromatic polyamides and more generally linear polyamides obtained by polycondensation between an aliphatic or aromatic diacid and an aromatic or aliphatic primary diamine, polyamides obtained by condensation of a lactam or of an amino acid, or linear polyamides obtained by condensation of a mixture of these various monomers.

More specifically, these copolyamides can be, for example, poly(hexamethylene adipamide), polyphthalamides obtained from terephthalic and/or isophthalic acid, or copolyamides obtained from adipic acid, hexamethylenediamine and caprolactam.

The polyamide is preferably chosen from the group consisting of polyamides obtained by polycondensation of at least one linear dicarboxylic acid with a linear or cyclic diamine, such as PA 6.6, PA 6.10, PA 6.12, PA 12.12 or PA 4.6, or between at least one aromatic dicarboxylic acid and a linear or aromatic diamine, such as polyterephthalamides, polyisophthalamides or polyaramids, and polyamides obtained by polycondensation of at least one amino acid with itself, it being possible for the amino acid to be generated by the hydrolytic opening of a lactam ring, such as, for example, PA 6, PA 7, PA 11 or PA 12.

The composition of the intervention can also comprise copolyamides derived in particular from the above polyamides, or the blends of these polyamides or copolyamides.

The preferred polyamides are chosen from the group consisting of: PA 66, PA 610, PA 612, PA 6.66, PA 46, MXD6, PA 66/6T, PA 6, PA 11 and PA 12. Preference is given in particular to polyamide 6.

Use is generally made of polyamides with a molecular weight suitable for injection molding processes, although it is also possible to use polyamides having lower or higher viscosities.

The polyamide can in particular be a polymer comprising star or H macromolecular chains, a branched or hyperbranched polymer, and, if appropriate, a polymer comprising linear macromolecular chains. Polymers comprising such star or H macromolecular chains are, for example, described in the documents FR 2 743 077, FR 2 779 730, U.S. Pat. No. 5,959,069, EP 0 632 703, EP 0 682 057 and EP 0 832 149.

The polyamide can be a polymer of random tree type, preferably a copolyamide exhibiting a random tree structure. These copolyamides with a random tree structure and their process of preparation are described in particular in the document WO99/03909. The matrix of the invention can also be a composition comprising a linear thermoplastic polymer and a star, H and/or tree thermoplastic polymer as described above. The matrix of the invention can also comprise a hyperbranched copolyamide of the type of those described in the document WO 00/68298. The composition of the invention can also comprise any combination of linear, star, H and tree thermoplastic polymer and hyperbranched copolyamide as described above.

The polyamide can exhibit a number of terminal acid groups of between 30 and 100 meq/kg. The polyamide can exhibit a number of terminal amine groups of between 30 and 100 meq/kg.

The composition according to the invention preferably exhibits from 30% to 95% by weight of polyamide, preferably from 40% to 80% by weight, with respect to the total weight of the composition.

The polyketone used according to the present invention can be aliphatic and/or aromatic.

Aliphatic polyketones are polymers comprising substantially one mol of carbon oxide for each mol of unsaturated monomer. This monomer can be chosen from alpha-olefins having from 2 to 12 carbon atoms or their substitution derivatives. It can also be chosen from styrene or its derivatives obtained by substitution with alkyls, such as methylstyrenes, ethylstyrene and isopropylstyrene. Preferably, the polyketones are copolymers of ethylene and carbon oxide or copolymers of ethylene, propylene and carbon oxide.

When the polyketones are copolymers of ethylene, a second monomer and carbon oxide, there may be at least two ethylene units for one unit of the second monomer and preferably from 10 to 100.

The polyketones can be represented by the formula:

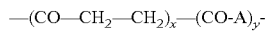

in which A denotes an unsaturated monomer having at least 3 carbon atoms, such as, for example, the propylene —CH$_2$—CH(CH$_3$)—, phenylene —C$_6$H$_4$— or aryl ether —C$_6$H$_4$—O—C$_6$H$_4$— radicals. The x/y ratio can be at least 2. Said units can be distributed at random in the polyketone chain.

The number-average molar masses can be between 1000 et 200,000 g/mol, advantageously between 20,000 et 90,000 g/mol, measured by gel permeation chromatography. The melting points can be between 175° C. and 300° C., generally between 200° C. and 270° C.

Syntheses of these polyketones are described in the patents U.S. Pat. No. 4,843,144, U.S. Pat. No. 4,880,903 and U.S. Pat. No. 3,694,412. Preference is given in particular to aliphatic polyketones obtained by reaction of gaseous ethylene and/or propylene with carbon monoxide via catalysis with palladium(II).

The composition according to the invention can comprise between 1% and 50% by weight of polyketone, preferably between 1% and 20% by weight, with respect to the total weight of the composition.

The term "novolac resin" is generally understood to mean a phenolic resin for which the formaldehyde/phenol ratio is less than 1, and which, for this reason, normally remains thermoplastic until it has been heated with an appropriate amount of a compound, for example formaldehyde or hexamethylenetetramine, capable of giving additional bonds and consequently of giving an infusible product.

The novolac resins are generally the condensation products of phenolic compounds with aldehydes or ketones. These condensation reactions are generally catalyzed by an acid or a base.

The polyamide according to the invention can comprise one or more different types of novolac resin.

The novolac resins generally exhibit a degree of condensation of between 2 and 15.

The phenolic compounds can be chosen, alone or as mixtures, from phenol, cresol, xylenol, naphthol, alkylphenols, such as butylphenol, tert-butylphenol or isooctylphenol, niitrophenol, phenylphenol, resorcinol or bisphenol A; or any other substituted phenol.

The aldehyde most frequently use is formaldehyde. However, use may be made of others thereof, such as acetaldehyde, paraformaldehyde, butyraldehyde, crotonaldehyde, glyoxal and furfural. Use may be made, as ketone, of acetone, methyl ethyl ketone or acetophenone. The aldehyde and/or the ketone can optionally carry another functional group, such as, for example, a carboxylic acid functional group. To this end, mention may in particular be made of glyoxylic acid or levulinic acid.

According to a specific embodiment of the invention, the novolac resin is a condensation product of phenol and formaldehyde.

The novolac resins used advantageously have a molecular weight of between 500 and 3000 g/mol, preferably between 800 and 2000 g/mol.

Mention may in particular be made, as commercial novolac resin, of the commercial products Durez®, Vulkadur® or Rhenosin®.

The composition according to the invention can comprise between 1% and 20% by weight of novolac resin, in particular from 1% to 10% by weight, with respect to the total weight of the composition.

Preference is given in particular to a composition comprising at least:
- 30% to 95% by weight of polyamide;
- 1% to 50% by weight of polyketone; and
- 1% to 20% by weight of novolac resin, with respect to the total weight of the composition.

The composition according to the invention can additionally comprise fillers and/or additives conventionally used in the manufacture of polyamide compositions. Thus, mention may be made of reinforcing and bulking fillers, lubricants, flame retardants, plasticizers, nucleating agents, impact modifiers, catalysts, light and/or heat stabilizers, antioxidants, antistatics, colorants, mattifying agents, molding aids or other conventional additives.

The composition according to the invention can also comprise reinforcing or bulking fillers, such as, for example, fibrous fillers and/or nonfibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among nonfibrous fillers, of all particulate or lamellar fillers and/or exfoliable or nonexfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is perfectly possible according to the invention for the composition to comprise several types of reinforcing fillers. Preferably, the most widely used filler can be glass fibers, of the "chopped" type, in particular having a diameter of between 7 and 14 μm. These fillers can exhibit a surface sizing which provides for the mechanical adhesion between the fibers and the polyamide matrix.

The concentration by weight of the reinforcing or bulking fillers is advantageously between 1% and 60% by weight, preferably between 15% and 50% by weight, with respect to the total weight of the composition.

It is possible in particular to add, to the polyamide composition, agents which modify the impact strength. It is generally elastomeric polymers which can be used to this end. The agents which modify the toughness are generally defined as having an ASTM D-638 tensile modulus of less than approximately 500 MPa. Examples of suitable elastomers are ethylene/acrylic ester/maleic anhydride products, ethylene/propylene/maleic anhydride products or ethylene/propylene/diene monomer products (EPDMs) with optionally a grafted maleic anhydride. The concentration of elastomer by weight is advantageously between 0.1% and 30%, with respect to the total weight of the composition.

Preference is given in particular to impact modifiers comprising functional groups which react with the polyamide. Mention may be made, for example, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and their hydrogenated versions. The proportion by weight of these modifiers in the total composition is in particular between 0.1% and 40%.

These fillers and additives can be added to the modified polyamide by normal means suited to each filler or additive, such as, for example, during the polymerization or in the melt blending.

The materials and compositions of the invention are generally obtained by blending the various constituents under hot conditions, for example in a single- or twin-screw extruder, at a temperature sufficient to keep the polyamide resin as a molten medium, or under cold conditions, in a mechanical mixer in particular. Generally, the blend obtained is extruded in the form of rods, which are cut up into pieces to form granules. The compounds can be added at any point in the process for the manufacture of the plastic, in particular by hot or cold blending with the plastic matrix. The addition of the compounds and additives can be carried out by addition of these compounds to the molten plastic matrix in the pure form or in the form of a concentrated mixture in a matrix, such as, for example, a plastic matrix.

The composition is preferably a composition to be molded, for example in the form of granules or powder, used in particular in the manufacture of articles by an injection molding process. The composition according to the invention can be used in any process for forming plastics, such as, for example, molding processes, in particular injection molding, rotational molding, sintering or casting, or extrusion processes, such as extrusion/blow molding and film-forming, or also spinning processes. The invention thus also relates to processes for the manufacture of molded or extruded articles by forming a composition of the invention.

The present invention also relates in particular to an injection molding process in which a composition according to the invention, in particular in the form of granules, is introduced into an injection-molding device and the molding is carried out.

The use of the compositions according to the invention is particularly advantageous in the context of the manufacture of articles for the motor vehicle, electrical or electronics industry or articles intended to contain or transport fluids, such as tanks, for example.

A specific language is used in the description so as to facilitate understanding of the principle of the invention. Nevertheless, it should be understood that no limitation of the scope of the invention is envisaged by the use of this specific language. Modifications and improvements can in particular be envisaged by a person conversant with the technical field concerned on the basis of his own general knowledge. The term "and/or" includes the meanings "and", "or" and all the other possible combinations of the elements connected to this term. Other details or advantages of the invention will become more clearly apparent in the light of the examples given below purely by way of indication.

EXPERIMENTAL PART

Example 1

Manufacture of the Compositions

Compositions based on polyamide 6 —PA- (reference S27BL from Rhodia Engineering Plastics, $H_2SO_4$ relative viscosity of 147 ml/g) and different proportions of aliphatic polyketone —PK— (Carilon D26HM100® Shell Chemicals) and novolac resin —NO— (Phenol-Formaldehyde Rhenosin PR95) are obtained by extrusion on a miniextruder.

The characteristics of the processing are as follows:
Twin-screw miniextruder: PRISM 25D, 16 mm screw, L/D=25, with:
 a temperature profile: of 225° C. for PA6 and 270° C. for PA66
 screw speed (rpm): 300
 motor force (N.m): 20
 venting: air
The rods coming out of the extruder are run into a water cooling tank and subsequently granulated. Test specimens are produced by injection molding in the following way:
Arburg Allrounder 350-90 220 D press, 30 mm screw, L/D=15
Max. clamping force: 350 kN
T (° C.) barrel: from 250 to 275
T (° C.) mold: 80
Injection rate (mm/s): 87.7
Injection pressure (bar): 42
Hold pressure (bar): 28
Backpressure (bar): 4
Screw speed (rpm): 195

Example 2

Analysis of the Formulations

Various tests were carried out on the formulations produced in example 1. The results are expressed in the following table 1:

TABLE 1

| Systems | | | | Water uptake at equilibrium (weight %) | Young's Modulus (MPa) | Yield stress (MPa) | Breaking stress (%) | Toughness @50RH (kJ/m$^2$) |
|---|---|---|---|---|---|---|---|---|
| PA | PK | NO | Ex. | | | | | |
| 100 | 0 | 0 | C1 | 3.6 | 3017 | 73.1 | 58.6 | 67 |
| 98 | 2 | 0 | C2 | 3.5 | 3058 | 72.9 | 72.4 | 195 |
| 96 | 4 | 0 | C3 | 3.5 | 2974 | 70.4 | 71.7 | 197 |
| 94 | 6 | 0 | C4 | 3.5 | 3011 | 70.0 | 70.7 | 197 |
| 92 | 8 | 0 | C5 | 3.4 | 2931 | 68.5 | 68.7 | 189 |
| 98 | 0 | 2 | C6 | 3.3 | 2933 | 74.2 | 62.7 | 53 |
| 96 | 0 | 4 | C7 | 3.3 | 2869 | 75.2 | 61.0 | 32 |
| 94 | 0 | 6 | C8 | 3.1 | 2778 | 78.1 | 62.5 | 25 |
| 92 | 0 | 8 | C9 | 2.9 | 2690 | 79.5 | 63.8 | 14 |
| 96 | 2 | 2 | 1 | 3.4 | 3372 | 78.5 | 68.4 | 182 |
| 92 | 4 | 4 | 2 | 3.0 | 4005 | 83.9 | 78.7 | n.m. |
| 88 | 6 | 6 | 3 | 2.8 | 3865 | 83.5 | 77.2 | n.m. | n.m. = not measured

The proportions of PA, PK and NO are expressed as percentage by weight with respect to the total weight of the composition. The water absorption measurements are carried out according to the standard ISO 1110. The Young's modulus is measured according to the standard ISO527. The yield stress is measured according to the standard ISO527. The breaking stress is measured according to the standard ISO527. The impact strength measurements are carried out according to the standard ISO 179-1/1eA.

The invention claimed is:

1. A melt-blended composition comprising
   40% to 98% by weight of a polyamide;
   1% to 20% by weight of a polyketone; and
   1% to 20% by weight of a novolac resin, with respect to the total weight of the composition.

2. The composition as described by claim 1, wherein the polyamide is selected from the group consisting of: a PA 66, a PA 610, a PA 612, a PA 6.66, a PA 46, a MXD6, a PA 66/6T, a PA 6, a PA 11 and a PA 12.

3. The composition as described by claim 1, wherein the polyketone is aliphatic.

4. The composition as described by claim 1, wherein the polyketone is represented by the formula:

$$(CO-CH_2-CH_2)_x-(CO-A)_y-$$

in which A denotes an unsaturated monomer having at least 3 carbon atoms and the x/y ratio is at least 2.

5. The composition as described by claim 1, wherein the polyketone is a copolymer of ethylene and carbon oxide.

6. The composition as described by claim 1, wherein the composition comprises a reinforcing or bulking filler and/or an impact modifier.

7. A method of reinforcing mechanical properties of a polyamide, the method comprising melt-blending a novolac resin and a polyketone with the polyamide to form the melt-blended composition according to claim 1.

8. The composition as described by claim 1, wherein the polyketone is a copolymer of ethylene, propylene and carbon oxide.

9. The composition as described by claim 1 comprising 40% to 96% by weight of the polyamide.

10. A molded article comprising a melt-blended composition comprising:
    40% to 98% by weight of a polyamide;
    1% to 20% by weight of a polyketone; and
    1% to 20% by weight of a novolac resin, with respect to the total weight of the composition.

11. The molded article as described by claim 10, wherein the molded article is an injection molded article.

12. The composition according to claim 1, comprising
    88% to 96% by weight of a polyamide;
    2% to 6% by weight of a polyketone; and
    2% to 6% by weight of a novolac resin, with respect to the total weight of the composition.

* * * * *